(12) United States Patent
Illg et al.

(10) Patent No.: US 6,735,308 B1
(45) Date of Patent: May 11, 2004

(54) MOBILE TELEPHONE CONNECTOR MODULE

(75) Inventors: Manfred Illg, Weinstadt (DE); Martin Gollhofer, Fellbach (DE); Dieter Clauss, Berglen (DE); Derek Andrews, Hampshire (GB); Tobias Schimmele-Brell, Weinstadt (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 393 days.

(21) Appl. No.: 09/650,059

(22) Filed: Aug. 28, 2000

(30) Foreign Application Priority Data

Aug. 30, 1999 (DE) .......................................... 299 15 180

(51) Int. Cl.[7] .............................................. H04M 1/00
(52) U.S. Cl. ..................................................... 379/438
(58) Field of Search ........................... 379/438, 433.05; 439/609, 610, 946, 248; 29/858; 343/702

(56) References Cited

U.S. PATENT DOCUMENTS

| | | | |
|---|---|---|---|
| 4,989,012 A | * | 1/1991 | Martensson et al. ........ 343/702 |
| 5,060,373 A | * | 10/1991 | Machura et al. .............. 29/858 |
| 5,516,303 A | * | 5/1996 | Yohn et al. .................. 439/248 |

FOREIGN PATENT DOCUMENTS

| | | |
|---|---|---|
| DE | 44 40 093 A1 | 11/1994 |
| DE | 196 05 297 A1 | 2/1996 |
| EP | 0 978 979 A2 | 7/1999 |

* cited by examiner

Primary Examiner—Jack Chiang
(74) Attorney, Agent, or Firm—Roger C. Turner

(57) ABSTRACT

A connector module (10) for installation on a small mobile telephone to enable the module to rest at a docking station where contacts mate to pass multiple medium to low frequency signals and power and to pass high frequency signals through a coaxial connection of high frequency signals as to an external antenna. The module includes a molded dielectric body (11) having a first body part (13) that holds the first contacts (17) for medium to low frequency signals and power, and having a second body part (14) that extends from a longitudinal end (98) of the first body part and that holds the coaxial contacts (16). The first contacts have strip-shaped mating sides (18) fixed to the body for engaging mating contacts by merely pressing the body against a row of resilient contacts on the docking station, while the coaxial contacts are constructed with the inner contact having a face that can be deflected by a mating inner contact (28) and with the outer coaxial contact (34) forming a conical recess (15) for receiving a corresponding projection on the mating outer coaxial contact member of the docking station.

2 Claims, 6 Drawing Sheets

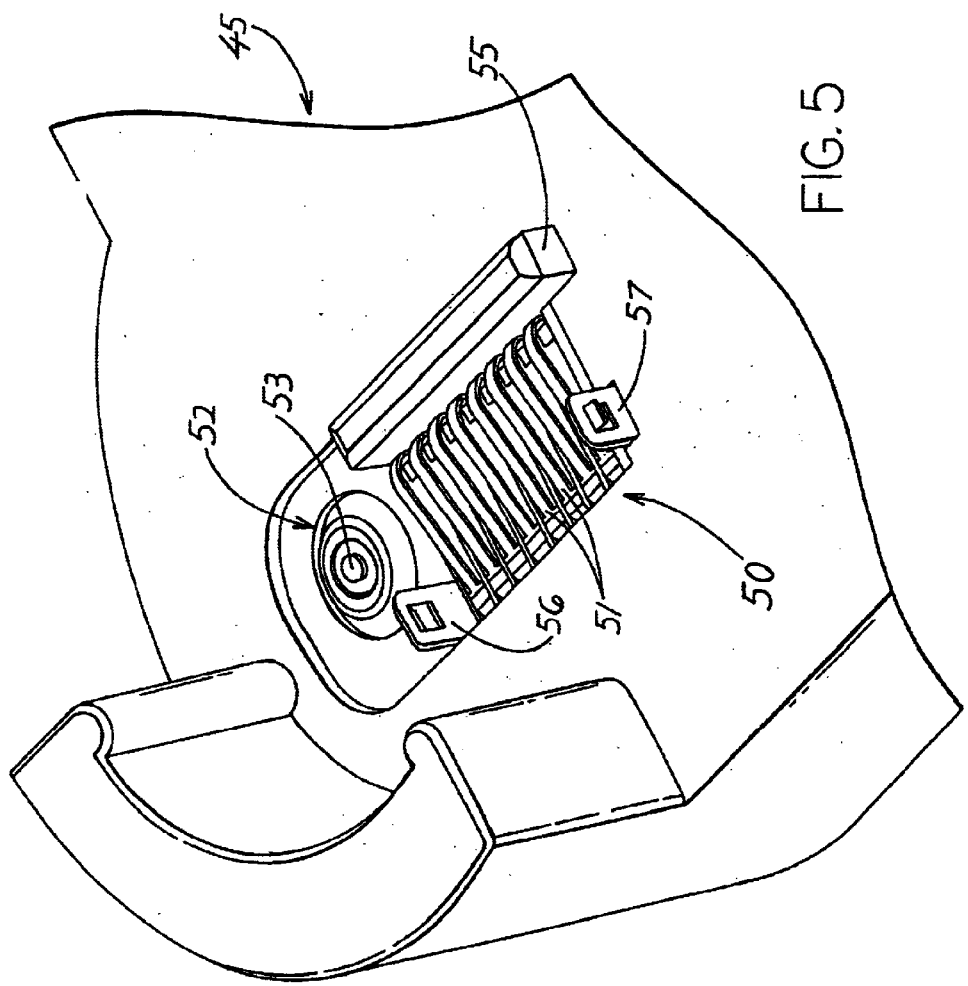

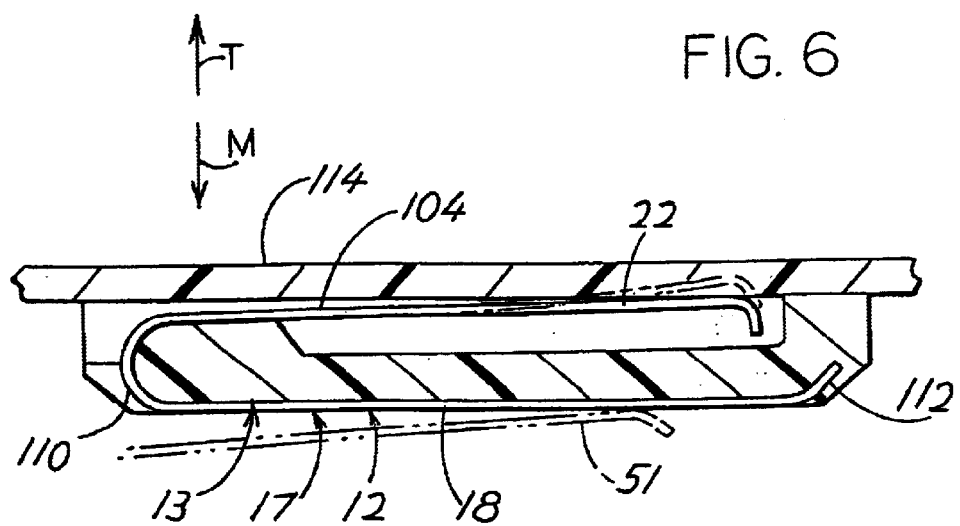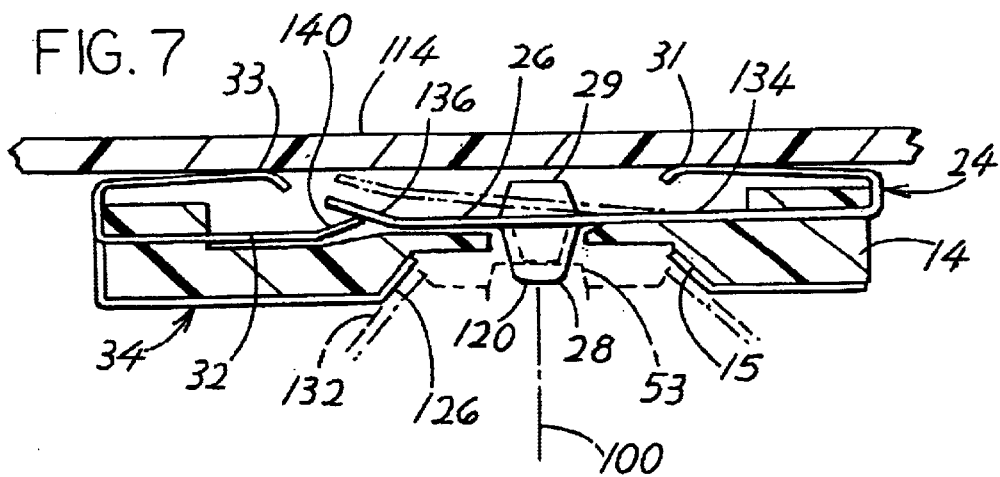

MOBILE TELEPHONE CONNECTOR MODULE

CROSS-REFERENCE

Applicant claims priority from German application 299 15 180.8 filed Aug. 30, 2000.

BACKGROUND OF THE INVENTION

A connector module that lie in the narrow underside of a mobile telephone, commonly includes signal contacts for passing power current and low to moderate frequency signals, and a coaxial contact for passing high frequency signals to an external antenna. Present connector modules of this type take up substantial space in the area that they occupy and in their thickness, which stands in the way of further miniaturization. Current coaxial connectors have substantial thickness because they use plug-in connectors with cylindrical inner and outer contacts that slideably engage mating cylindrical surfaces. It would be desirable to provide a connector module of small footprint and small thickness to facilitate the construction of even smaller mobile telephones.

SUMMARY OF THE INVENTION

In accordance with one embodiment of the present invention, a connector module is provided for installation in a mobile telephone apparatus, which is of small thickness and which has a small footprint. The module includes a molded dielectric body that is largely in the form of a longitudinally-elongated plate with first and second body parts at its end portions. A row of first contacts with a row of strip-shaped sides lies along the mating side of the first body part, and a coaxial contact pair is mounted in the second body part. The coaxial contact pair has inner and outer contacts that face at least partially in the mating direction for engaging corresponding contacts on a docking station by pressure applied in the mating direction.

The novel features of the invention are set forth with particularity in the appended claims. The invention will be best understood from the following description when read in conjunction with the accompanying drawings.

BRIEF DESCRIPTION OF THE DRAWINGS

FIG. 5 is an isometric view of a docking station which can connect to the connector module of FIG. 4.

FIG. 6 is a sectional view taken on line 6—6 of FIG. 1, and showing the module mounted on a circuit board of a telephone apparatus and also showing, in phantom lines, the connector module close to mating with contacts of the docking station of FIG. 5.

FIG. 7 is a sectional view taken on line 7—7 of FIG. 1, and with the termination end mounted on a circuit board of a telephone apparatus, and showing, in phantom lines, the coaxial contacts mated to those of the docking station of FIG. 5.

DESCRIPTION OF THE PREFERRED EMBODIMENTS

Figure 1:
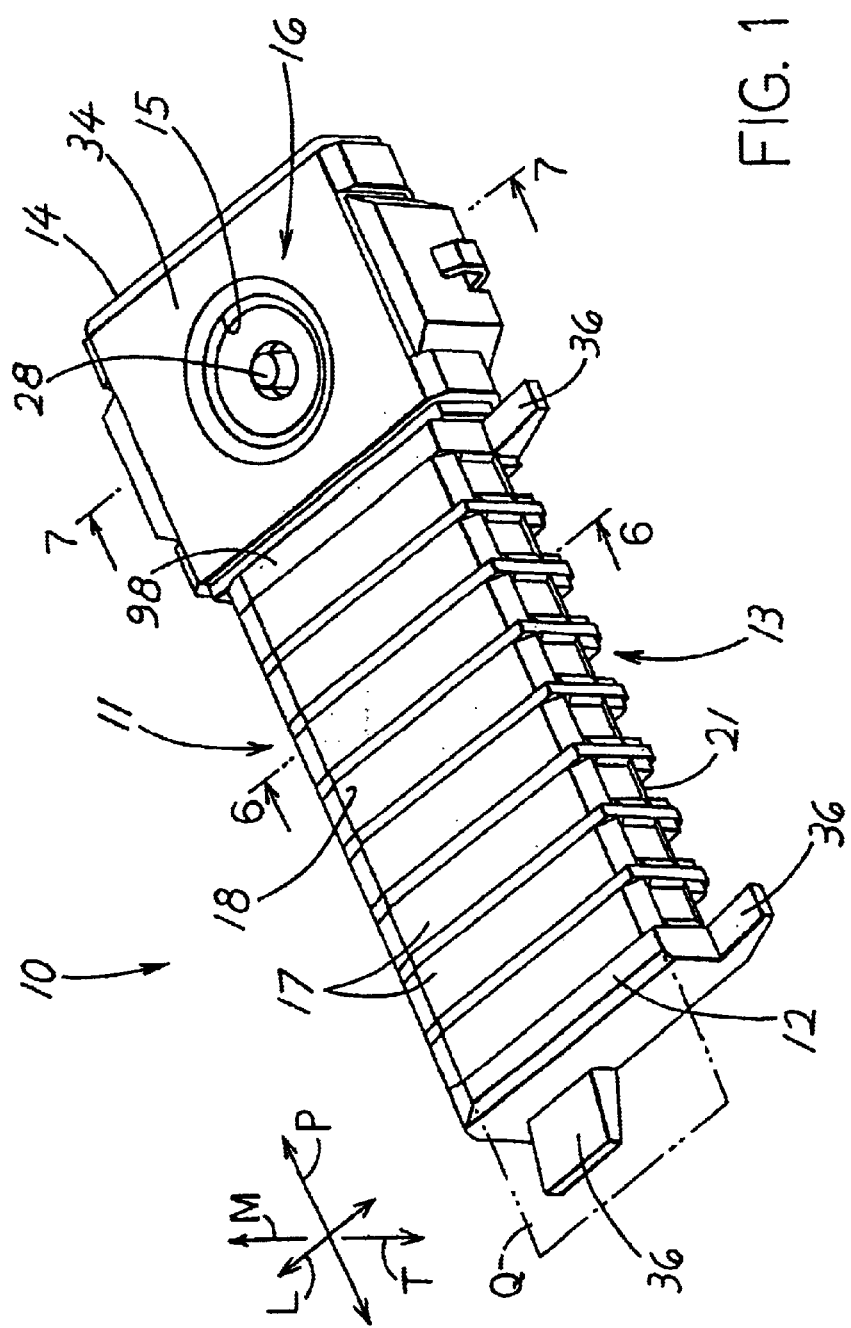
FIG. 1 is an isometric view of a connector module of one embodiment of the invention showing the front or mating face thereof.
Figure 2:
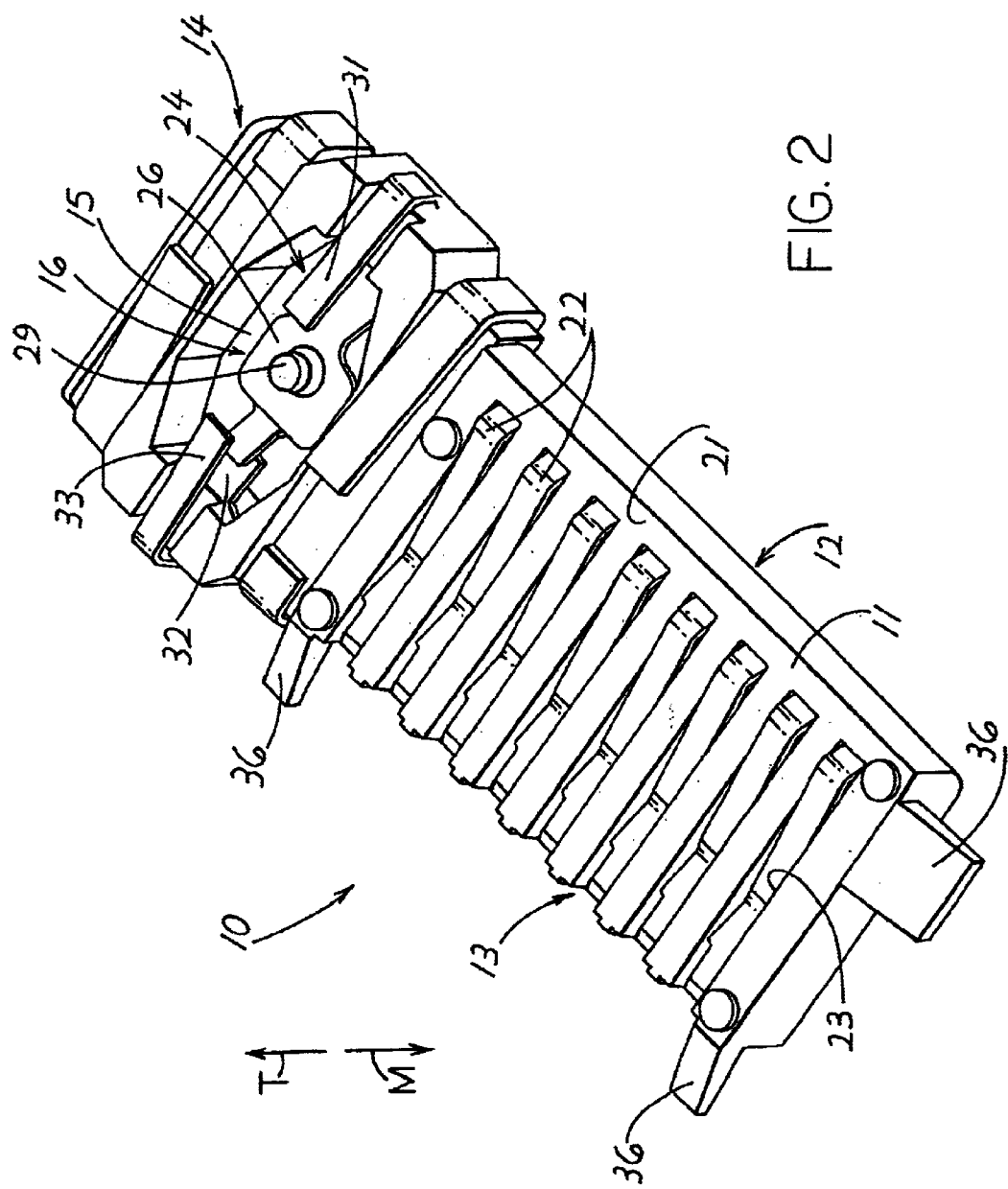
FIG. 2 is an upside-down isometric view of the connector module of FIG. 1, showing the termination face thereof.
Figure 4:
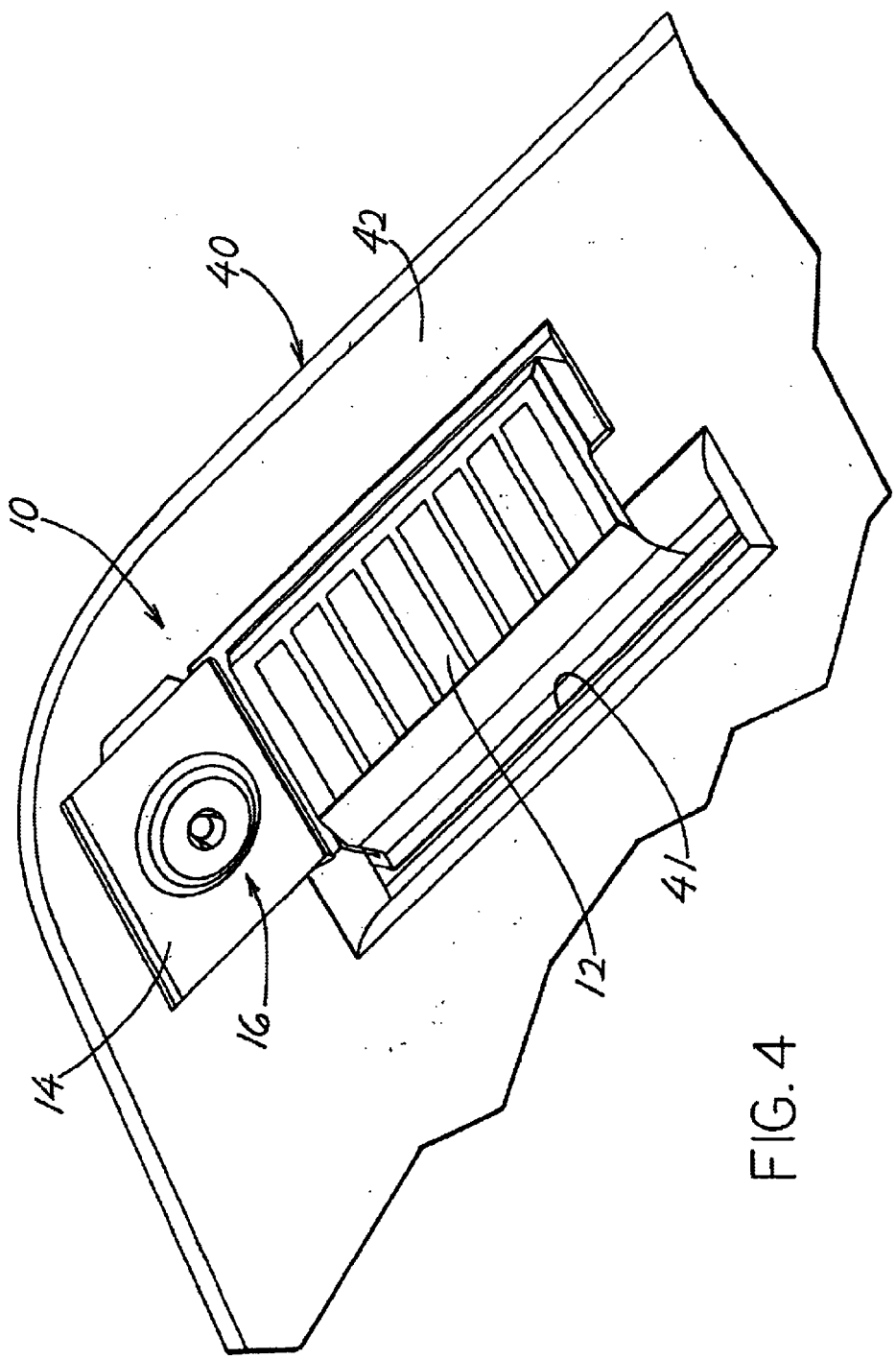
FIG. 4 is a top isometric view of the connector of FIG. 1 shown mounted in a mobile telephone apparatus.

FIG. 1 illustrates a connector module 10 for installation in the rear of a mobile telephone, preferably in a region close to the antenna of the telephone. FIG. 4 shows the module 10 installed in a recess 41 of a mobile telephone 40, with an upper or mating face 12 of the module exposed at a telephone face 42. The telephone 40 with the module 10 is commonly used as an independent unit. However, the telephone 40 may be temporarily mounted on a docking station shown at 45 in FIG. 5, where control signals are passed and power current may be provided to charge batteries in the telephone, and where an internal antenna in the telephone may be disconnected from signals to be broadcast, with the signals instead connected to an external antenna mounted on the docking station.

Referring again to FIG. 1, it can be seen that the connector module includes a body 11 of a molded dielectric, or insulating material having a substantially rectangular profile with a longer length in a longitudinal direction P than in a perpendicular lateral direction L, and having a small thickness in forward and rearward directions, which may be referred to as mating M and termination T directions, respectively. The mating side or face 12, which lies in a plane Q, is designed to be pressed against mating contacts on the docking station, while the opposite rear or termination side 21 is designed to mount on a circuit board or the like of a mobile telephone. The body has a first part 13 that holds a row of first contacts 17 with mating sides 18 that are flush with the rest of the mating face 12 of the module. The body has a second part 14 that lie beyond an end 98 of the first part. The second part 14 holds a coaxial contact pair 16 comprising an inner contact 28 and an outer contact 34. The first contacts 17 are designed to carry medium to low frequencies, such as power current (possibly at zero frequency) or voice or medium frequency data signals. The coaxial contact pair 16 is designed to carry high frequency signals such as the frequency at which a mobile telephone broadcasts radio signals.

FIG. 6 shows the structure of the body first part 13 and of one of the first contacts 17. The first or mating sides 18 of the first contacts are molded into the first body part at 110 and 112, and lie flush with the mating face 12 of the body. The first contacts have termination sides 104 with contact ends 22 that press against traces on a circuit board 114 in the mobile telephone. When the mobile telephone is mounted on the docking station, signal contacts 51 of the docking-station press against the mating side 18 of the first contacts. The first contacts are formed of simple strips of metal such as a copper alloy.

FIG. 7 shows the second part 14 of the body and the inner and outer coaxial contacts 24, 34. The inner coaxial contact 24 is formed by a strip of metal with a mating surface 120 facing along an axis 100 in the mating direction M, and with a termination side 31 that engages a trace on the circuit board 114. The outer contact 34 includes a metal plate that forms a recess 15 with a conical mating surface 126 at the walls of the recess. The plate has a terminal side 33 that presses against another trace on the circuit board 114. The docking station has inner and outer coaxial contacts 53, 132 that engage the contact surfaces 120, 126 when the connector module presses against the docking station contact arrangement. To enable firm engagement of both coaxial contacts, the mating surface 120 of the connector module is movable in a termination direction T (by at least 0.5 mm), until the conical contact surfaces 126, 132 engage each other. This is accomplished by mounting the inner contact mating surface 120 on a blade 134 that is deflectable in a termination direction. In addition, applicant grounds the inner contact to the outer contact 34 by having a shorting end 136 of the inner contact engage a part 140 on the outer contact, until the inner contact is deflected in a termination direction.

Figure 3A:
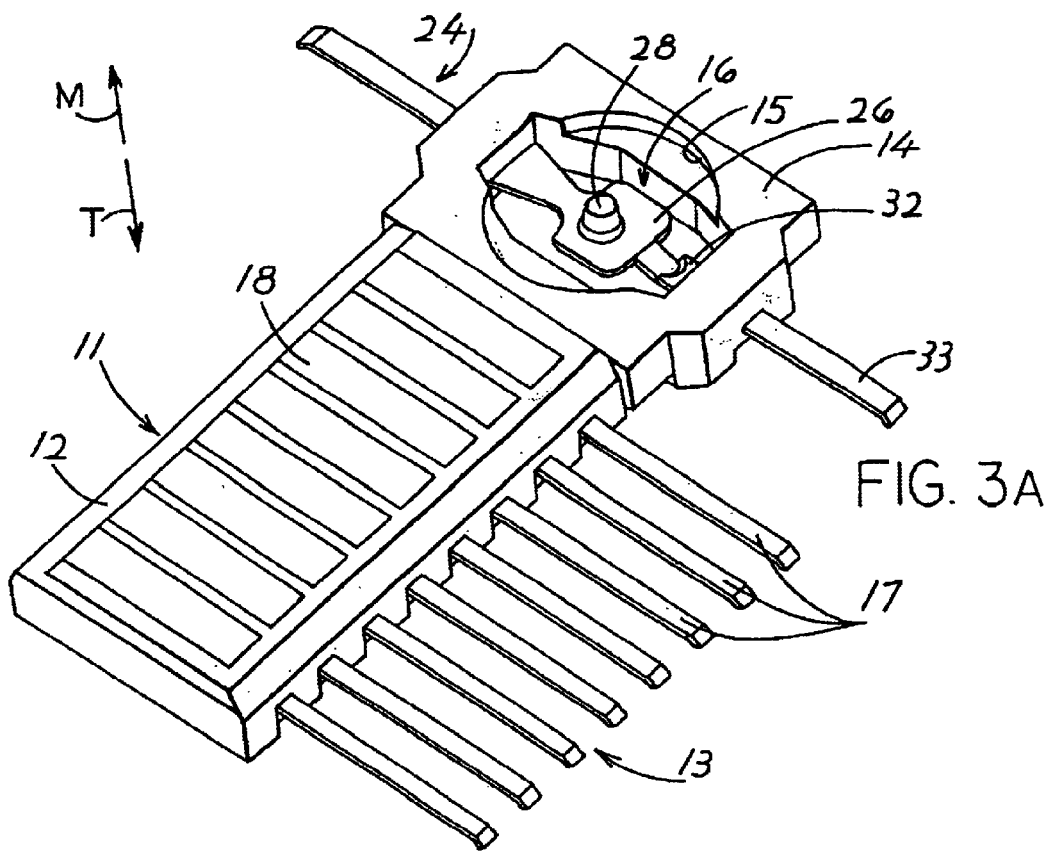
FIG. 3A is a top isometric view of the connector of FIG. 1, in the course of its assembly, and without the outer coaxial contact plate.
Figure 3B:
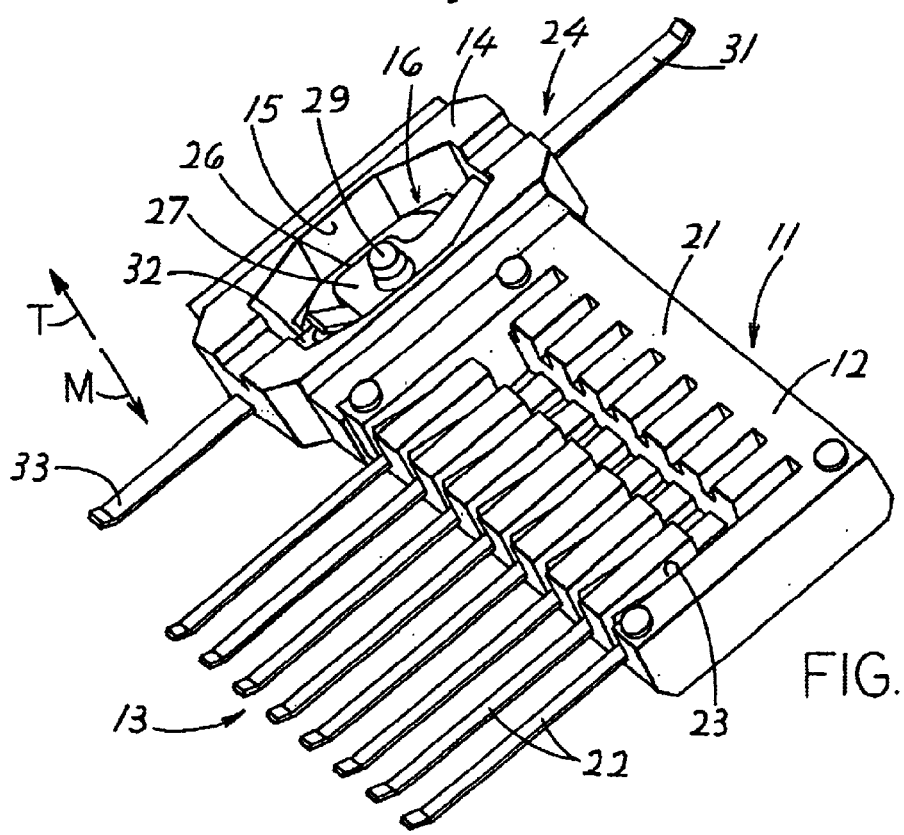
FIG. 3B is an upside-down view of the connector module of FIG. 3A shown during its construction.

FIGS. 3A and 3B show the connector module during its construction. The first contact arrangement 13 and the coaxial contact arrangement 16 are placed in an injection mold that forms the body with the contacts molded in it. After such molding, the termination sides of the contacts are bent about 180° so they project slightly from the rear face 21 of the body to press against circuit board traces.

FIG. 1 shows that the body has molded-on tongues 36 that can fix the body to the rest of the mobile telephone, if solder is not used. FIG. 5 shows snap-in hooks 56, 57 that can hold a cable plug. A strip-like projection 55 of the docking station can enter a recess 41 (FIG. 4) in the module to position the module.

The connector module can be made in a small size, as where the height of the module in the directions M, T is about 2 mm, the width in a lateral direction L is about 8 mm, and the length in the longitudinal directions P is about 30 mm. Such a small size is achieved largely by the fact that the coaxial contacts are not sleeve-shaped parts that must fit into corresponding mating sleeve-shaped parts, but instead there is surface engagement as described above. The coaxial contacts lie at a longitudinal end of the body, to minimize crosstalk between the high frequency signals passing through the coaxial contacts and the first contacts.

Thus, the invention provides a connector module for installation in a mobile telephone, where the module has a small footprint (along its longitudinal and lateral directions) and has a very small thickness. The module includes a row of metal strips with mating surfaces that are flush with a first part of the body, the body having a second part that holds a pair of coaxial contacts. The coaxial contacts include a center contact that is deflectable in a termination direction, and an outer contact forming a recess with largely conical walls. A docking station has a row of contacts with resilient ends that press against the stationary mating ends of the contacts in the module. The coaxial mating contacts of the docking station include an inner contact with a projecting end and an outer contact with a largely conical projection that fits into the conical recess in the outer contact of the module.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A combination of a connector module and a docking station for receiving the connector module, wherein:
   said docking station has inner and outer coaxial docking contact members;
   said connector module includes a dielectric body having a mating side and having an opposite termination body side and includes a coaxial contact pair lying in said body, said coaxial contact pair comprising an inner contact lying on an axis and having a mating surface facing primarily in a mating direction that is opposite to a termination direction, said coaxial contact pair also including an outer contact lying around said axis, with said outer contact forming a largely conical recess;
   said inner coaxial docking contact member has an engaging surface facing primarily opposite said mating direction and said outer coaxial docking contact member is constructed to enter said largely conical recess and engage said outer contact;
   said inner contact is deflectable and has a shorting end and said outer contact has a switching part that is positioned to engage said shorting end until said inner contact is deflected opposite to said mating direction.

2. A coaxial connector which includes a circuit board having a board face with conductive traces, and a dielectric body having a mating side and an opposite termination side, said connector also having a coaxial contact pair that includes an inner contact with an inner contact mating surface that faces at least partially in said mating direction and an outer coaxial contact that surrounds said inner contact and that has an outer contact mating surface that faces at least partially in said mating direction, wherein:
   said inner contact mating surface of said inner coaxial contact is biased in a mating direction but is deflectable in an opposite termination direction;
   said outer contact mating surface surrounds said inner mating surface and forms a tapered depression; and
   said inner and outer coaxial contacts are each formed of a piece of sheet metal and each has a termination side in the form of a strip that extends primarily parallel to the circuit board face and has a strip end portion that is moveable with respect to said body and that is biased against one of said traces.

* * * * *